United States Patent

[15] 3,706,172

Keith

[45] Dec. 19, 1972

[54] FOAM LAMINATES

[72] Inventor: Donald George Keith, Stockton-on-Tees, England

[73] Assignee: Imperial Chemical Industries Limited, London, England

[22] Filed: Aug. 5, 1970

[21] Appl. No.: 61,050

[30] Foreign Application Priority Data

Aug. 21, 1969 Great Britain.....................41,845/69

[52] U.S. Cl. ..........................52/521, 52/539, 52/595
[51] Int. Cl. ..............................E04c 1/10, E04c 2/10
[58] Field of Search........................52/529-531, 539, 52/585, 542, 309, 478, 519, 521, 520, 522, 404, 409, 593-595

[56] References Cited

UNITED STATES PATENTS 3,479,784  11/1968  Massagli.................................52/588

FOREIGN PATENTS OR APPLICATIONS 420,307   4/1947   Italy........................................52/520
544,151   7/1957   Canada..................................52/519
209,298   11/1966  Sweden..................................52/529

Primary Examiner—John E. Murtagh
Attorney—Cushman, Darby & Cushman

[57] ABSTRACT

A foam laminate, the lower facing sheet is a preformed metal pan with sharp vertical edges, two opposite edges of the pan being shaped, near the foot thereof, one as an outwardly-extending and the other as a co-operating inwardly-extending hairpin bend such that, when a pair of pans are to be connected, the hairpin bends form a snap-fit with each other.

3 Claims, 5 Drawing Figures

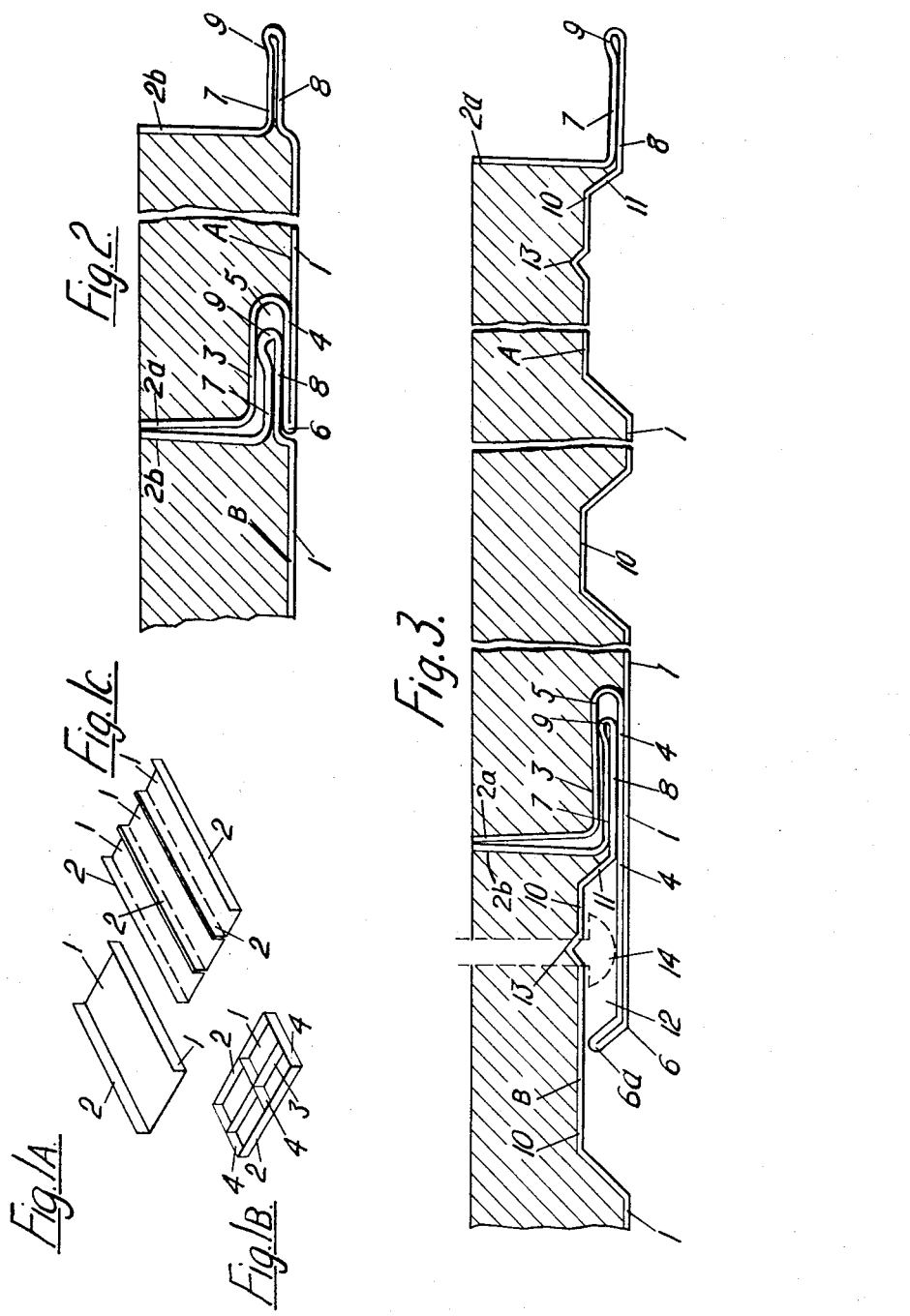

FOAM LAMINATES

BACKGROUND OF THE INVENTION

The present invention relates to foam laminates of the kind comprising a rigid layer of foam (for example foamed polyurethane, polystyrene, polyvinylidene chloride, urea formaldehyde, epoxy resins, polyethylene) confined between two skins. Foam laminates of the kind described are useful as structural units and insulating material (e.g. in the building and packaging industries), and various processes for their manufacture have been proposed, for example in prior British Pat. Nos. 997,086, 1,098,472, 1,098,473 and 1,053,192 (corresponding to U.S. application Ser. No. 838,003).

In particular, said prior British Pat. No. 1,053,192 describes and claims a process for the continuous manufacture of foam laminates consisting of a foam layer of uniform texture confined between two skins of differing predetermined surface contours which process comprises passing a first flexible skin having a surface of a predetermined desired shape continuously through guiding means underneath a foam dispenser, depositing an even layer of nascent foam on said first skin, while the latter either is sufficiently rigid in itself or by means of supports is made sufficiently rigid to impart its own shape to the underside of the foam, causing said foam layer to rise while travelling with said first skin, to adhere to it and to set to such consistency that essentially it ceases to flow under the force of gravity, inverting said first skin-and-foam-layer laminate while the foam is still tacky and impressing the tacky foam surface on to a second skin having a non-planar surface of a predetermined desired shape and travelling at the same speed and in the same direction as and in close proximity to and underneath the inverted first skin-foam laminate and causing said foam to fully cure and bond to both skins. According to said prior British Pat. No. 1,053,192, the nascent foam may be a polyurethane foam, or the foam may be formed from polystyrene, polyvinylidene chloride, urea formaldehyde, epoxy resins or polyethylene. Further, according to said patent, said second non-planar skin onto which the foam is inverted, may be a metal sheet having reinforcing grooves or reinforcements, and said first flexible skin may be, inter alia, a continuous paper sheet, plastics film, sheet metal, metal foil (e.g. aluminum foil), or a sheet of textile-reinforced plastics comprising a woven or non-woven textile substrate made of a material selected from the group consisting of cotton, jute, rayon, nylon, polyethylene terephthalate, glass fiber and polypropylene and mixtures thereof, bonded with and at least partly embedded in a flexible plastics material selected from the group consisting of polyvinyl chloride, nitro-cellulose, acrylonitrile-butadiene-styrene co-polymers and natural and synthetic rubbers formulated with plasticizers, stabilizers, anti-oxidants, fillers and other additives for said textile-reinforced plastics sheet. If desired, said first flexible skin may be stripped off its adjacent foam surface after the foam has fully cured.

In the process of said prior British Pat. No. 1,053,192, as the foam is inverted onto the second non-planar skin (which is preferably, but not necessarily, a metal sheet) it is still a gel, and in our copending U.S. application Ser. No. 847,021 we have described how, if the non-planar skin is formed or provided with one or more upstanding ribs or the like, these simply slice through the gel and the resulting laminate is thus provided with internal ribs embedded in the foam. There can thus be produced neat foam-filled rigid pans, in particular metal pans, which may or may not have a flexible covering skin above the foam (depending on whether or not the above mentioned first flexible skin is stripped off the cured foam).

The problem arises, however, as to how to joint such foam-filled pans to one another (e.g. to form a wall, partition, ceiling or the like) in a simple, rapid, efficient and aesthetically pleasing manner. This problem is aggravated by the fact that any such jointing must take place at, or very close to, the bottom of the ribs since practically the whole of the ribs above the joint must be not only substantially vertical but also substantially straight, otherwise the ribs will not slice through the foam when the latter is inverted onto the pans.

DETAILED DESCRIPTION OF THE INVENTION

The invention accordingly provides in or for a foam laminate comprising a rigid layer of foam confined between an upper flexible skin and a substantially rigid but bendable lower skin preformed in the shape of a pan having a base bounded at each of two opposite edges thereof by an upstanding, substantially vertical straight rib, jointing means comprising one of the ribs (hereinafter called "the first rib") bent to form, near the foot thereof, a substantially horizontal, inwardly extending, relatively open first hairpin bend, the bottom arm of the first hairpin bend bent back on itself in a tight second hairpin bend to form part of the base of the pan, the other rib (hereinafter called "the second rib") bent to form, near the foot thereof, a substantially horizontal, outwardly extending, relatively tight third hairpin bend and the inwardly extending bottom arm of the third hairpin bend further bent and extended inwardly thereby to form the remainder of the base of the pan, the outwardly extending hairpin bend of the second rib (i.e. the "third hairpin bend") of one pan being adapted to be pushed into and engaged by the inwardly extending relatively open hairpin bend of the first rib (i.e. the "first hairpin bend") of a similar adjacent pan.

Preferably, the outwardly extending hairpin bend of the second rib of one pan (or third hairpin bend) provides a snap-fit with the inwardly extending relatively open hairpin bend of the first rib (or first hairpin bend) of the similar adjacent pan. To this end the former may be formed at its outermost end as an enlarged bulb or Dutch end. Conveniently, the pan is made of sheet metal, the foam is polyurethane foam, and the upper flexible skin is strippable from the upper surface of the foam.

The invention makes it possible to provide a continuous structure, such as a wall, partition or the like, comprising a plurality of foam laminates connected by jointing means as described hereinabove.

The invention is further described by reference to the accompanying drawings where:

FIGS. 1A–1C are perspective views showing substantially rigid non-planar sheets, preferably metal sheets, onto which the foam may be inverted; and FIGS. 2 and 3 are elevation views showing how the filled pans may be joined together according to the invention.

Referring to the drawings more particularly, FIG. 1A shows a sheet 1 provided, at each edge thereof, with a narrow vertical rib 2 which slices through the foam which is thus able completely to fill the pan-shaped sheet 1, and which serves to protect, cover and confine the foam within the pan-shaped sheet; this idea is carried further in FIG. 1B wherein, in addition to the side ribs 2, there are provided additional foam-slicing longitudinal and transverse ribs 3 and 4 respectively; FIG. 1C illustrates that a plurality of pans similar to that shown in FIG. 1A can be foam-filled simultaneously or successively depending, respectively, on whether their foam-slicing ribs 2 are parallel or transverse to the direction of travel of the pans. In all the pans as illustrated in FIGS. 1A, 1B, 1C, the vertical ribs may be sufficiently tall to slice through the whole of the foam up to the flexible skin thereabove (and they may even slice through the latter if they are tall enough and sharp enough).

One simple embodiment of the invention is illustrated in FIG. 2., wherein A and B represent two identical metal pans, similar to those illustrated in FIGS. 1A and 1C, but provided with jointing means according to the present invention.

As in FIGS. 1A and 1C, each of the pans A, B, is provided with upstanding side ribs 2a, 2b which slice through the tacky gel-like foam which is inverted onto the pans which thus become filled with foam which cures therein. The side ribs 2a, 2b are preferably bent slightly outwardly at a small angle (e.g. about 2°) to the vertical. Near its foot, the rib 2a is bent, first inwardly through about 90° as shown at 3 and then outwardly through about 180° as shown at 4, to form a relatively open first hairpin bend 5; thereafter it is again bent inwardly through about 180° as shown at 6, to form a very tight second hairpin bend of which the underside constitutes part of the base 1 of the pan. Meanwhile, near its foot, the rib 2b is bent, first outwardly through about 90° as shown at 7 and then inwardly through about 180° as shown at 8 to form a very tight third hairpin bend whose outer extremity 9 is shaped to form a bulb end or small-angled Dutch bend; this latter, outwardly projecting third hairpin bend is located on the rib 2b at such a height above the base 1 of the pan that it will slide into the relatively open first hairpin bend 5 of the rib 2a of an adjacent pan, and the width of the first hairpin bend 5 and the size of the bulb end 9 are preselected to provide a snap fit. If desired, some mastic or other adhesive may be inserted in the closed end of the first hairpin bend 5 to ensure a completely secure joint between the two pans. It will be observed that when the pan B is pushed fully home into the pan A their adjoining bases 1 form a substantially continuous surface except for the very small gap between the second hairpin bend 6 of pan A and the base of the pan B, which gap may also be filled with mastic or other adhesive.

The pans A and B may be foam-filled individually (as in FIG. 1A) and subsequently connected to one another on site; or they may first be connected together as described above and then foam-filled simultaneously (as in FIG. 1C).

(In practice, the joint between panels A and B will be less thick, as compared to the height of the ribs 2a and 2b, than appears from the drawings).

A preferred, and more sophisticated, embodiment of the invention is illustrated in FIG. 3 of the drawings, in which the base 1 of each of the pans A, B, is profiled for example with upstanding ridges 10 (which are too wide to slice the foam in the same way as the ribs 2a, 2b). If the foam has gelled sufficiently by the time it is inverted onto the pans, it will be sliced through by the ribs 2a, 2b, but it may merely bond to the upper surfaces of the ridges 10 without entering the troughs between adjacent ridges 10, which troughs may therefore be used as service ducts for electric wiring or the like.

The ribs 2a, 2b are bent in substantially the same way as in FIG. 2, with the following exceptions:
1. The inwardly bent portion 8 of the tight hairpin bend of the rib 2b (the third hairpin bend) is bent upwardly, as shown at 11, and then bent inwardly to form one of said ridges 10.
2. The very tight second hairpin bend 6 of the rib 2a is extended outwardly under the adjoining ridge 10 of the adjacent pan, and then bent upwardly, as shown at 6a, until it abuts the under surface of the ridge 10 so that, viewed from the under side, the jointed pans present substantially unbroken profiled surface, with a hollow space 12 bounded by the ridge 10 and connecting portion 11 of the pan B and by the outwardly extending portion 4 and the upwardly extending portion 6a of the second hairpin bend 6 of the pan A. This hollow space 12 may be used, inter alia, for concealed fastenings of the pans A, B (for example, to a wall or to another panel or the like). Near the rib 2b, the ridge 10 may be provided with an inverted V-shaped notch 13 for locating a fixing such as a screw or nail head 14. (In such a case, the pans A and B would normally be foam-filled before being connected, and subsequently fixed and connected on site).

The embodiment illustrated in FIG. 3 lends itself particularly to the production of double metal-faced foam laminates. Thus a second pair of foam-filled pans, identical to the foam filled pans A, B may be placed upside down upon the first pair and connected to each other by screws or nail heads 14 and further secured to each other by a small quantity of adhesive on their adjacent flexible skins (or their adjacent foam surfaces if their flexible skins have been stripped off).

I claim:
1. A foam laminate comprising a rigid layer of foam confined between an upper flexible skin and a substantially rigid but bendable lower skin preformed in the shape of a pan having a base bounded at each of two opposite edges thereof by an upstanding, substantially vertical straight rib, the base-forming portion of the ribs bent to form a profiled base comprising alternate upstanding ridges and depressions and joining means adapted to join one pan with a similar adjacent pan comprising a first rib and a second rib, said first rib bent to form, near the foot thereof, a substantially horizontal, inwardly extending, relatively open first hairpin bend, the bottom arm of the first hairpin bend extended further outwardly under the adjacent ridge of a similar adjacent pan and then upwardly until it abuts the undersurface of the adjacent ridge, then bent back on itself in a tight second hairpin bend to form part of the base of the pan, said second rib bent to form, near the foot thereof, a substantially horizontal, outwardly extending, relatively tight third hairpin bend, the inwardly extending bottom arm of the third hairpin bend further bent upwardly near the foot of the vertical portion of the second rib and then inwardly to form an upstanding ridge adjacent to the vertical portion of the rib, and then extended inwardly, thereby forming the remainder of the base of the pan, the outwardly extending hairpin bend of the second rib being adapted to be pushed into and engaged by the inwardly extending relatively open hairpin bend of the first rib of a similar adjacent pan, that when viewed from their respective undersides, the joined pans present a substantially unbroken profiled surface with a hollow space bounded on the top by the said adjacent ridge and on the bottom by the further outwardly extending bottom arm of the first hairpin bend of the first rib.

2. A foam laminate as claimed in claim 1, wherein the outwardly extending relatively tight third hairpin bend of the second rib on one pan forms a snap-fit with the inwardly extending relatively open first hairpin bend of the first rib of a similar adjacent pan.

3. A foam laminate as claimed in claim 2, wherein the outwardly extending relatively tight third hairpin bend of the second rib of each pan is formed at its outermost end as an enlarged bulb.

* * * * *